(No Model.)

S. C. C. CURRIE.
APPARATUS FOR MEASURING THE STRENGTH OF ELECTRIC CURRENTS.

No. 438,226. Patented Oct. 14, 1890.

Witnesses:
Hermann Bormann.
Thomas M. Smith.

Inventor:
Stanley C. C. Currie.
by J. Walter Douglass.
Att'y.

THE NORRIS PETERS CO., PHOTO-LITHO., WASHINGTON, D. C.

UNITED STATES PATENT OFFICE.

STANLEY CHARLES CUTHBERT CURRIE, OF PHILADELPHIA, PENNSYLVANIA, ASSIGNOR TO THE UNITED GAS IMPROVEMENT COMPANY, OF SAME PLACE.

APPARATUS FOR MEASURING THE STRENGTH OF ELECTRIC CURRENTS.

SPECIFICATION forming part of Letters Patent No. 438,226, dated October 14, 1890.

Application filed March 29, 1890. Serial No. 345,911. (No model.)

*To all whom it may concern:*

Be it known that I, STANLEY CHARLES CUTHBERT CURRIE, a subject of the Queen of Great Britain, but now residing in the city of Philadelphia, in the county of Philadelphia and State of Pennsylvania, have invented certain new and useful Improvements in Apparatus for Measuring the Strength of Electric Currents, of which the following is a specification.

In my invention, relating in general to apparatus for measuring the strength of electric currents, use is made of a substance composed of finely-divided iron filings and an insulating adhesive material, whereby the apparatus or instrument is rendered applicable to alternating as well as to direct currents.

The principal object of my invention is to provide a simple, durable, and efficient instrument for measuring the strength of electric currents.

My invention consists of an electric-current indicator having an armature composed of metallic chips or shavings and silicate of soda and arranged in the manner hereinafter described, and pointed out in the claims.

The nature and characteristic features of the invention will be more fully understood from the following description, taken in connection with the accompanying drawings, forming part thereof, and in which—

Figure 1:
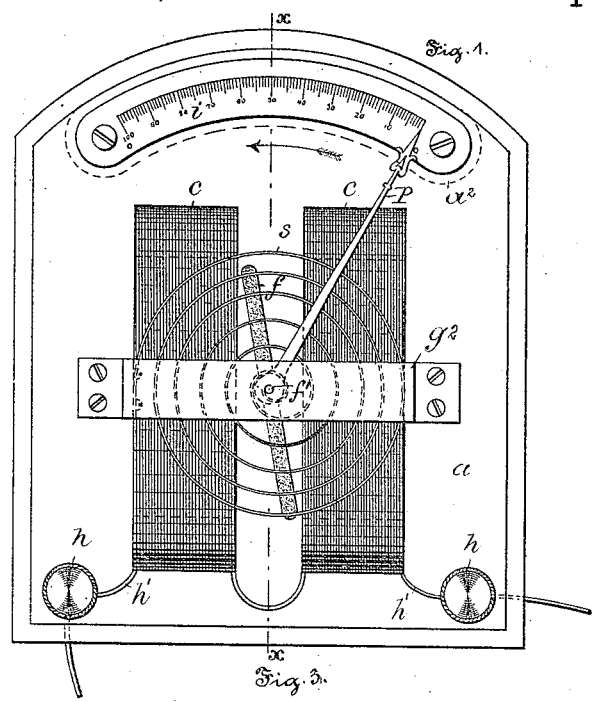
Figure 2:
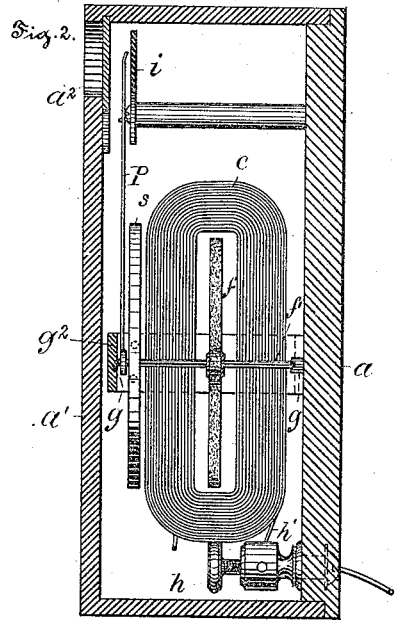
Figure 3:
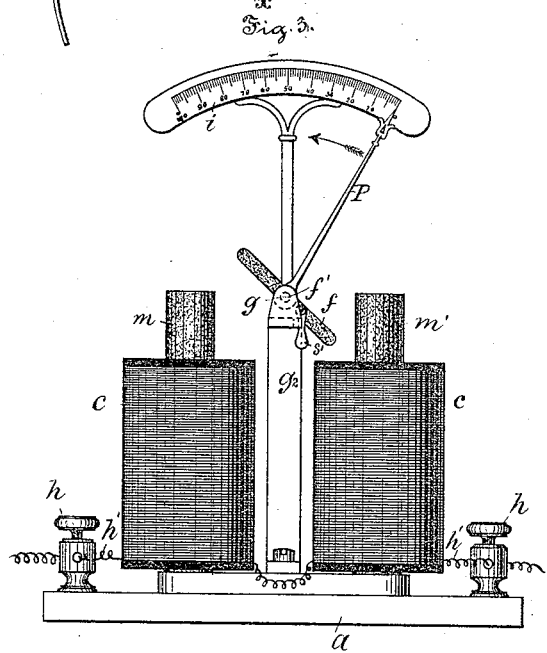
Figure 4:
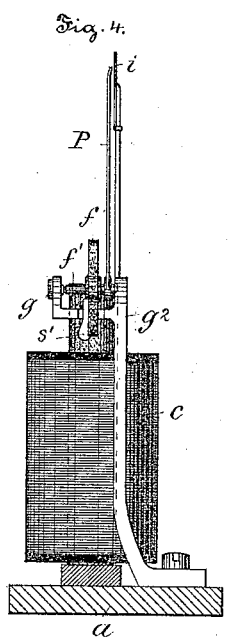

Figure 1 is a front elevation of an instrument embodying my invention and showing a movable armature surrounded by one or more coils of wire. Fig. 2 is a transverse section on the line $x\,x$ of Fig. 1, showing the detail arrangement of the parts of the instrument. Fig. 3 is a front elevation of an instrument embodying a modified form of my invention and having the parts thereof arranged to form an electro-magnet; and Fig. 4 is a transverse central section of Fig. 3, showing the detail arrangement of the parts of the instrument.

In the drawings, $a$ is a base plate or panel for supporting the parts of the instrument.

$a'$ is a cover or housing for protecting the internal parts of the device.

$a^2$ is an aperture formed in the front of the housing $a'$ for observing a movable pointer.

$c$ is a continuous coil secured to the panel $a$ and divided into two parts in order to permit of the insertion and adjustment of an armature $f$. This armature $f$ consists of a bar composed, preferably, of a compressed mixture of iron chips or shavings and an insulating adhesive substance, as silicate of soda, and attached to a spindle $f'$.

$g$ and $g'$ are bearings or sockets supported, respectively, by the panel $a$ and bracket $g^2$ and adapted for the reception of the spindle $f'$. The pointer or index-finger P and one extremity of the spiral spring $s$ are secured to the spindle $f'$. The other extremity of the spiral spring $s$ is secured to the bracket $g^2$.

It may be remarked that the spring $s$ is adjusted so as to cause the armature $f$ to occupy a position slightly at an angle to the plane of the winding of the coil $c$ when no current is passing through the latter, so that when the current is permitted to pass through the coil $c$ the armature $f$ and pointer or index-finger P will tend to turn in the direction indicated by the arrow in Fig. 1. Moreover, the spring $s$ acts to counterpoise the force of the magnetic attraction tending to deflect the armature $f$. Of course a weight $s'$ may be used instead of a spring, and such construction is shown in Fig. 2.

$h$ are binding-posts secured to the panel $a$ and in communication with the ends of the coil $c$ by means of the conductors $h'$.

$i$ is a graduated dial secured to the panel $a$ and located adjacent to the pointer or index-finger P and so as to be observed through the aperture $a^2$.

The construction of the instrument illustrated in Figs. 3 and 4 is the same as above described with reference to Figs. 1 and 2, with the following exceptions: that the coil $c$ is wound around the cores $m$ and $m'$, so as to form an electro-magnet, and the armature $f$ is located between said cores $m$ and $m'$ and adapted to turn in the direction indicated by the arrow in Fig. 3 when the electro-magnet is energized. Excellent results have been obtained in practice by making the cores $m$ and $m'$, as well as the armature $f$, out of a compressed mixture of finely-divided iron and silicate of soda, and hence preference is given to these materials for their formation.

The mode of operation of my invention is as follows: The instrument is included either in a circuit or in a branch thereof by means of the binding-posts $h$, and the current whose strength is to be ascertained is permitted to traverse the coil $c$. The coils $c$, Figs. 1 and 2, or the cores $m$ and $m'$, Figs. 3 and 4, become energized, thereby attracting the armature $f$, which tends to cause it and the pointer or index-finger P to turn in the direction indicated by the arrows in the drawings. The deflection of the pointer or index-finger P with reference to the dial $i$ may be readily observed and the strength of the current ascertained for each position of the pointer by experiment, or the dial may be experimentally graduated by passing currents of known strength through the coil $c$, or in any other preferred manner, so that the strength of the current may be read from the dial in the usual manner.

It is obvious that portions of the invention may be used separately and that modifications may be made as to details without departing from the spirit thereof.

Having thus described the nature and objects of my invention, what I claim as new, and desire to secure by Letters Patent, is—

1. The combination, in an apparatus for measuring the strength of electric currents, of a circuit, a divided coil or electro-magnet included in said circuit, a pointer, an index, and an armature formed of compressed metallic chips or shavings and silicate of soda or similar material, substantially as shown and described.

2. The combination, in an apparatus for measuring the strength of electric currents, of a panel, a housing provided with an aperture, a circuit, an electro-magnet interposed in said circuit, a pointer and index, an armature attached to said pointer, and the armature and cores of the electro-magnet formed of compressed metal chips or shavings and silicate of soda or similar material, substantially as shown, and for the purposes described.

In witness whereof I have hereunto set my signature in the presence of two subscribing witnesses.

STANLEY CHARLES CUTHBERT CURRIE.

Witnesses:
  GEO. W. REED,
  THOMAS M. SMITH.